United States Patent
Arai

(10) Patent No.: US 10,901,667 B2
(45) Date of Patent: Jan. 26, 2021

(54) IMAGE FORMING APPARATUS, USAGE INFORMATION OUTPUT METHOD, AND INFORMATION PROCESSING SYSTEM

(71) Applicant: Shohei Arai, Kanagawa (JP)

(72) Inventor: Shohei Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,774

(22) Filed: Mar. 17, 2019

(65) Prior Publication Data

US 2019/0303072 A1   Oct. 3, 2019

(30) Foreign Application Priority Data

Mar. 28, 2018   (JP) .................................. 2018-062935

(51) Int. Cl.
*G06F 3/12*   (2006.01)

(52) U.S. Cl.
CPC .......... *G06F 3/1238* (2013.01); *G06F 3/1267* (2013.01); *G06F 3/1273* (2013.01); *G06F 3/1286* (2013.01)

(58) Field of Classification Search
CPC combination set(s) only.
See application file for complete search history.

(56) References Cited

U.S. PATENT DOCUMENTS

| 6,771,385 | B1* | 8/2004 | Iizuka | G06F 3/1204 |
| | | | | 358/1.15 |
| 2011/0119371 | A1* | 5/2011 | Toshima | G06F 21/552 |
| | | | | 709/224 |
| 2014/0098400 | A1* | 4/2014 | Kaneko | G03G 15/502 |
| | | | | 358/1.15 |
| 2015/0371292 | A1* | 12/2015 | Akutsu | G06Q 30/0283 |
| | | | | 705/400 |
| 2017/0228204 | A1* | 8/2017 | Hamakawa | H04N 1/00 |
| 2018/0039452 | A1 | 2/2018 | Nagamori | |
| 2018/0091370 | A1 | 3/2018 | Arai | |
| 2018/0183970 | A1* | 6/2018 | Kawai | H04N 1/32122 |

FOREIGN PATENT DOCUMENTS

| JP | 2010-210685 | 9/2010 |
| JP | 2016-005227 | 1/2016 |
| JP | 2018-020480 | 2/2018 |

* cited by examiner

*Primary Examiner* — Helen Zong
(74) *Attorney, Agent, or Firm* — Oblon, McClelland, Maier & Neustadt, L.L.P.

(57) ABSTRACT

An image forming apparatus, a usage information output method, and an information processing system are provided. The image foisting apparatus acquires device identification information of the image forming apparatus, receives input of user identification information, acquires device usage information stored in association with the user identification information when input of the user identification information is received, and acquires the device usage information stored in association with the device identification information of the image forming apparatus when input of the user identification information is not received, and outputs display data on the acquired device usage information.

14 Claims, 13 Drawing Sheets

FIG. 7

COUNTER SETTING

| DEVICE ID | MAC ADDRESS | CUSTOMER ID | USER ID | DAILY DATA ID | MONTHLY DATA ID | MONTHLY CALCULATION DATE | ... |
|---|---|---|---|---|---|---|---|

FIG. 8

DAILY DATA

| DAILY DATA ID | YEAR/ MONTH/DATE | COUNTER DATA ||||| |
|---|---|---|---|---|---|---|
| | | TOTAL | BY FUNCTION | ... | BY COLOR | BY PAPER SIZE | ... |

FIG. 9

MONTHLY DATA

| MONTHLY DATA ID | YEAR/ MONTH | COUNTER DATA ||||| |
|---|---|---|---|---|---|---|
| | | TOTAL | BY FUNCTION | ... | BY COLOR | BY PAPER SIZE | ... |

ND INFORMATION PROCESSING SYSTEM

IMAGE FORMING APPARATUS, USAGE INFORMATION OUTPUT METHOD, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2018-062935, filed on Mar. 28, 2018, in the Japan Patent Office, the entire disclosure of which is hereby incorporated by reference herein.

BACKGROUND

Technical Field

The present disclosure relates to an image forming apparatus, a usage information output method, and an information processing system.

Background Art

In a reporting system for visualizing the usage of an image forming apparatus, such as the number of printed sheets, for example, there are techniques for outputting a report representing the usage of the image forming apparatus in the form of a graph or a table.

Conventionally, the image forming apparatus acquires and displays usage information from a usage information storage device that stores information on actual usage results of devices in association with device identification information.

SUMMARY

Embodiments of the present disclosure describe an image forming apparatus, a usage information output method, and an information processing system are provided. The image forming apparatus acquires device identification information of the image forming apparatus, receive input of user identification information, acquires device usage information stored in association with the user identification information when input of the user identification information is received, and acquires the device usage information stored in association with the device identification information of the image forming apparatus when input of the user identification information is not received, and outputs display data on the acquired device usage information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7 is an illustration of a configuration of a counter setting according to embodiments of the present disclosure;

FIG. 8 is an illustration of a configuration of daily data according to embodiments of the present disclosure;

FIG. 9 is an illustration of a configuration of monthly data according to embodiments of the present disclosure;

Figure 1:
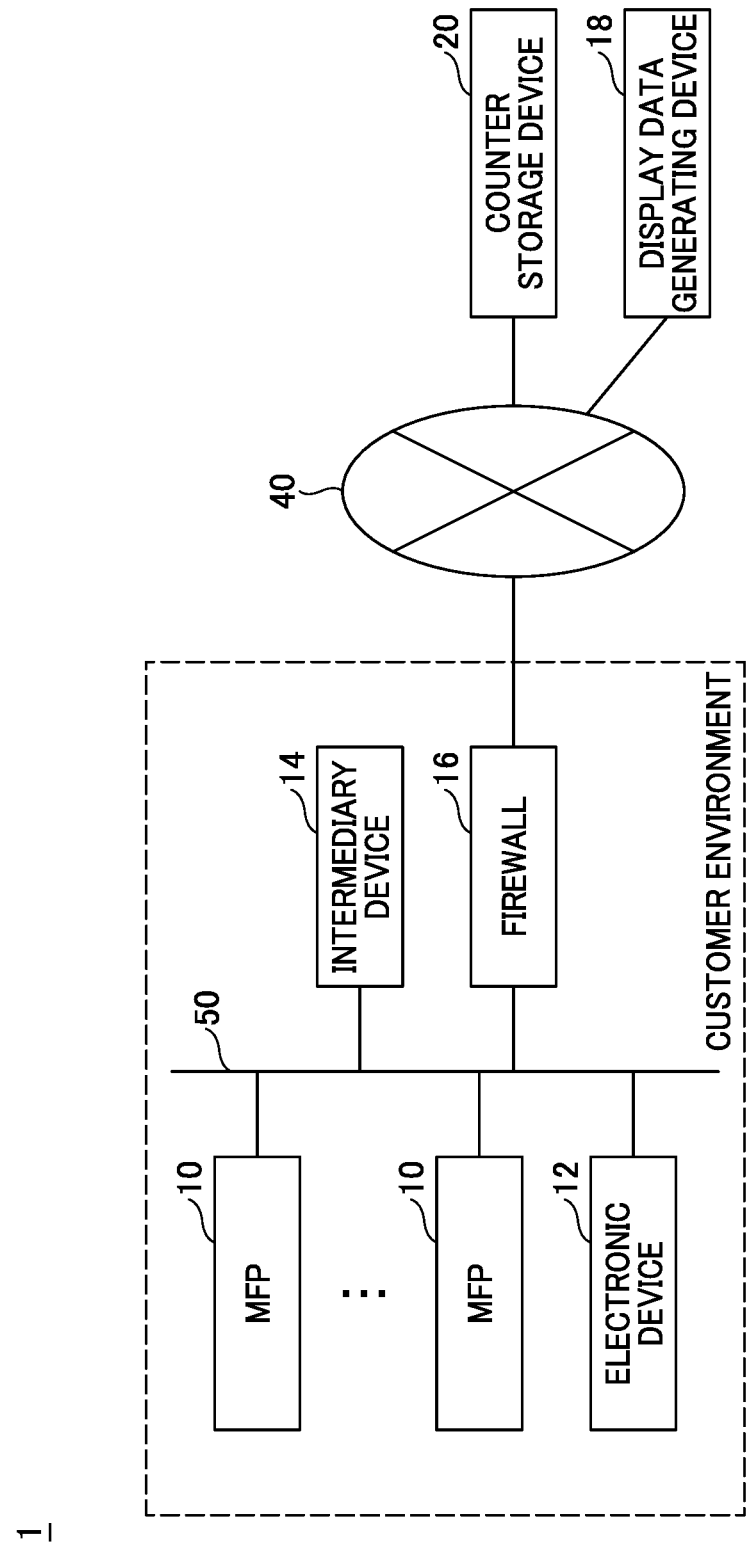
FIG. 1 is a schematic view illustrating a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, a description is given of several embodiments of the present disclosure with reference to the drawings.

System Configuration

FIG. 1 is a schematic view illustrating a configuration of an information processing system according to embodiments of the present disclosure. In the information processing system 1 illustrated in FIG. 1, a customer environment is connected to a counter storage device 20 and a display data generating device 18 through a network 40 such as the Internet.

The customer environment is a customer side network environment. The customer may be either an individual user or an organization such as a company, a group, or a division. In the customer environment, one or more multifunction peripherals (MFP) 10, an electronic device 12, an intermediary device 14, and a firewall 16 are connected through a network 50 such as a local area network (LAN).

The MFP 10 is an example of an image forming apparatus, having a print function, a scan function, a copy function, a facsimile function, or the like. The electronic device 12 is also an example of the image forming apparatus, for example, a laser printer, a projector, an electronic whiteboard, a video conference device, a camera, an industrial device, a medical device, or the like having a communication function. The MFP 10 and the electronic device 12 have a function of receiving an input of user identification information from a user and a function of displaying a report on the usage amount of the MFP 10 and the electronic device 12. The function of receiving input of user identification information from the user is implemented by reading information from the integrated circuit (IC) card owned by the user or accepting input of identification (ID) and password from the user.

The intermediary device 14 collects usage information (counter data) indicating the usage log of the MFP 10 and the electronic device 12 from the MFP 10 and the electronic device 12, and collectively transmits the usage information (counter data) to the counter storage device 20. Alternatively, the MFP 10 or the electronic device 12 may transmit the counter data to the counter storage device 20 directly without intervention of the intermediary device 14.

The information processing system 1 may not include the intermediary device 14. The counter data transmitted to the counter storage device 20 is also referred to as lifetime counter data and continues to be counted when the corresponding function or the like is used since the MFP 10 and the electronic device 12 were produced until the present.

The counter storage device 20 accumulates counter data of the MFP 10 and the electronic device 12 received from the customer environment as described below. The display data generating device 18 receives a report display request specifying at least one of identification information of the device (the MFP 10 or the electronic device 12) or identification information of the user who operates the device, and acquires a counter value corresponding to the identification information from the counter storage device 20. Based on the acquired counter value, the display data generating device 18 generates display data of a report on the usage amount of the device as described below and provides the display data to the device that requested the display data. The MFP 10 or the electronic device 12 which requested the display data displays the report on the usage amount of the device as described below based on the provided display data.

The configuration of the information processing system 1 illustrated in FIG. 1 is an example and one or more servers, such as a proxy server or a gateway server, that may intervene between the customer environment and the counter storage device 20 and the display data generating device 18. The display data generating device 18 and the counter storage device 20 may be implemented by being distributed among a plurality of information processing apparatuses. In addition, some or all of the functions of the counter storage device 20 and the display data generating device 18 may be provided in other servers.

As described above, in the information processing system 1 according to embodiments, the counter storage device 20 collects information indicating the actual usage record of the MFP 10 and the electronic device 12. The MFP 10 and the electronic device 12 designate at least one of the device identification information or the user identification information and make a request to display the usage amount to the display data generating device 18.

The display data generating device 18 acquires the counter value corresponding to the designated identification information from the counter storage device 20, generates the display data of the usage amount report based on the acquired counter value as described below, and provides the display data to the device of the report display request source. The MFP 10 or the electronic device 12 which requested the display data displays the report on the usage amount of the device designated by the identification information as described below.

Hardware Configuration
(Computer)

Figure 2:
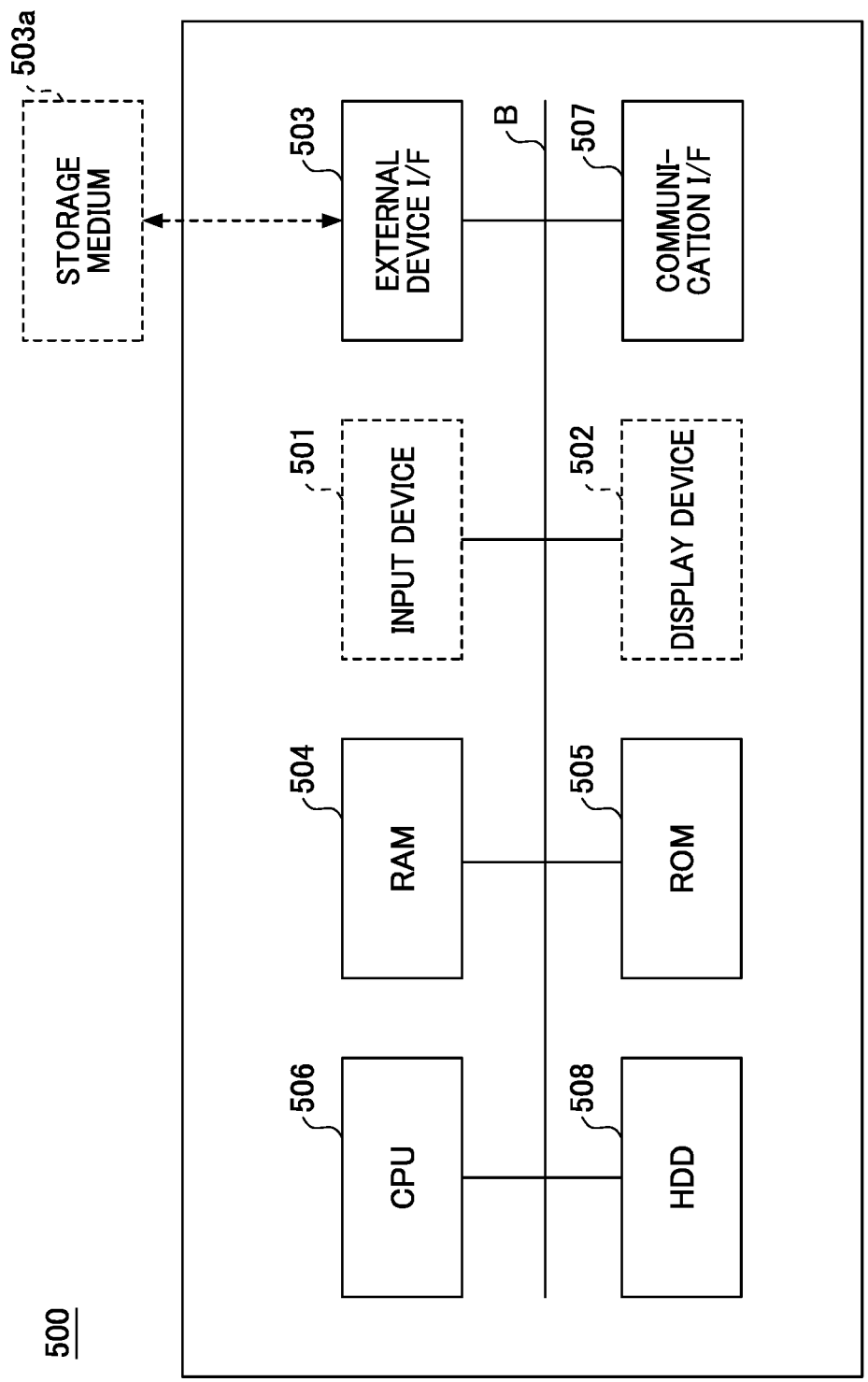
FIG. 2 is a block diagram illustrating a hardware configuration of a computer according to embodiments of the present disclosure.

One or more information processing apparatuses that implement the counter storage device 20 and the display data generating device 18, respectively, in FIG. 1 are implemented by a computer having a hardware configuration as illustrated for example, in FIG. 2.

FIG. 2 is a block diagram illustrating a hardware configuration of the computer. As illustrated in FIG. 2, the computer 500 includes an input device 501, a display device 502, an external device interface (I/F) 503, a random access memory (RAM) 504, a read only memory (ROM) 505, a central processing unit (CPU) 506, a communication interface (I/F) 507, and a hard disc drive (HDD) 508, which are connected to one another via a bus B. Note that the input device 501 and the display device 502 may be connected to the bus B as necessary.

The input device 501 includes a keyboard, a mouse, and a touch panel to enable the user to input various operation signals. The display device 502 displays results of processing performed by the computer 500.

The communication I/F 507 is an interface that connects the computer 500 to various networks. The computer 500 performs data communication through the communication I/F 507.

The HDD 508 is an example of a nonvolatile storage device storing programs and data. Examples of the programs or data stored in the HDD 508 include an operating system (OS) as basic software for controlling an entire operation of the computer 500 and application software providing various functions on the OS. The application software may be referred to as an "application" hereinafter, in order to simplify description. The computer 500 may include, instead of or in addition to the HDD 508, a drive device such as a solid state drive (SSD) that uses a flash memory as a storage medium.

The external device I/F 503 is an interface that connects the computer 500 to an external device. Examples of the external device include a storage medium 503a, the external device I/F 503 enables the computer 500 to read or write data from or to the storage medium 503a. Examples of the storage medium 503a include a flexible disc, a compact disc (CD), a digital versatile disc (DVD), a secure digital (SD) memory card, and a universal serial bus (USB) memory.

The ROM 505 is an example of a nonvolatile semiconductor memory (storage) capable of storing the program and data even when the power is not supplied. The ROM 505 stores program and data such as a basic input output system (BIOS), which is executed when the computer 500 starts up, OS settings, and network settings. The RAM 504 is an example of a volatile semiconductor memory (storage device) that temporarily stores program and data.

The CPU 506 loads programs or data from a storage device such as the ROM 505 and the HDD 508 onto the RAM 504 and executes processes to implement overall control of the computer 500 or functions of the computer 500. The display data generating device 18 and the counter storage device 20 can implement various kinds of processing as described below by the hardware configuration of the computer 500 illustrated, for example, in FIG. 2.

(MFP)

Figure 3:
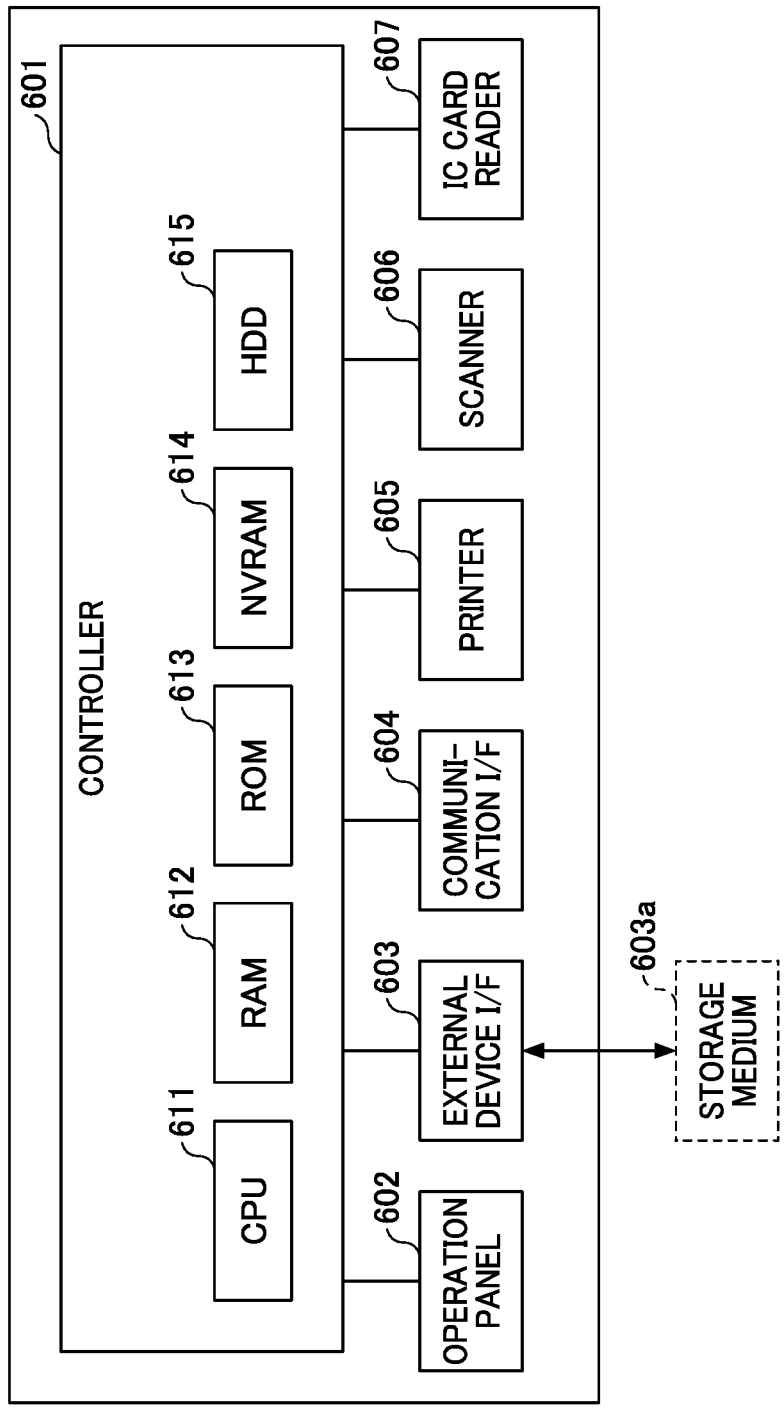
FIG. 3 is a block diagram illustrating a hardware configuration of a multifunction peripheral (MFP), according to embodiments of the present disclosure.

The MFP 10 illustrated in FIG. 1 is implemented by a computer having a hardware configuration as illustrated, for example, in FIG. 3. FIG. 3 is a block diagram illustrating a hardware configuration of the MFP 10. As illustrated in FIG. 3, the MFP 10 includes a controller 601, an operation panel 602, an external device I/F 603, a communication I/F 604, a printer 605, a scanner 606, and an IC card reader 607.

The controller 601 includes the CPU 611, the RAM 612, the ROM 613, a non-volatile random-access memory (NVRAM) 614, and the HDD 615. The ROM 613 stores various programs and data. The RAM 612 temporarily stores programs and data. The NVRAM 614 stores, for example, setting information. The HDD 615 stores various programs and data.

The CPU 611 performs processes according to the programs, data, setting information, etc., read from the ROM 613, the NVRAM 614, the HDD 615, etc., onto the RAM 612 to control an entire operation of the MFP 10 and implement functions of the MFP 10.

The operation panel 602 includes an input unit that receives a user input, and a display unit that displays various information. The external device I/F 603 is an interface with an external device. Examples of the external device include a storage medium 603a. The external device I/F 603 enables the MFP 10 to read and write data from and to the storage medium 603a. Examples of the storage medium 603a include an IC card, the flexible disc, the CD, the DVD, the SD memory card, the USB memory, a subscriber identification module (SIM) card, and the like.

The communication I/F 604 is an interface to connect the MFP 10 to the network 60. The MFP 10 performs data communication through the communication I/F 604. The printer 605 is a printing device that forms an image on a conveyed medium in accordance with print data. Examples of the conveyed medium include paper, coated paper, thick paper, overhead projector (OHP) transparencies, plastic films, pre-preg, and copper foil. The scanner 606 is a reading device that scans a document to obtain image data (electronic data).

FIG. 3 illustrates an example of the MFP 10, and in the case of the electronic device 12 other than the MFP 10, the printer 605 and the scanner 606 may not be provided. Further, the electronic device 12 may have hardware other than illustrated in FIG. 3 such as a camera, a lamp light source, a touch panel or the like. The MFP 10 identifies a user who operates the MFP 10 based on the ID and password input from the user at the time of login (usage start request) or the information acquired through the IC card reader 607, for example.

Functional Configuration (Counter Storage Device)

Figure 4:
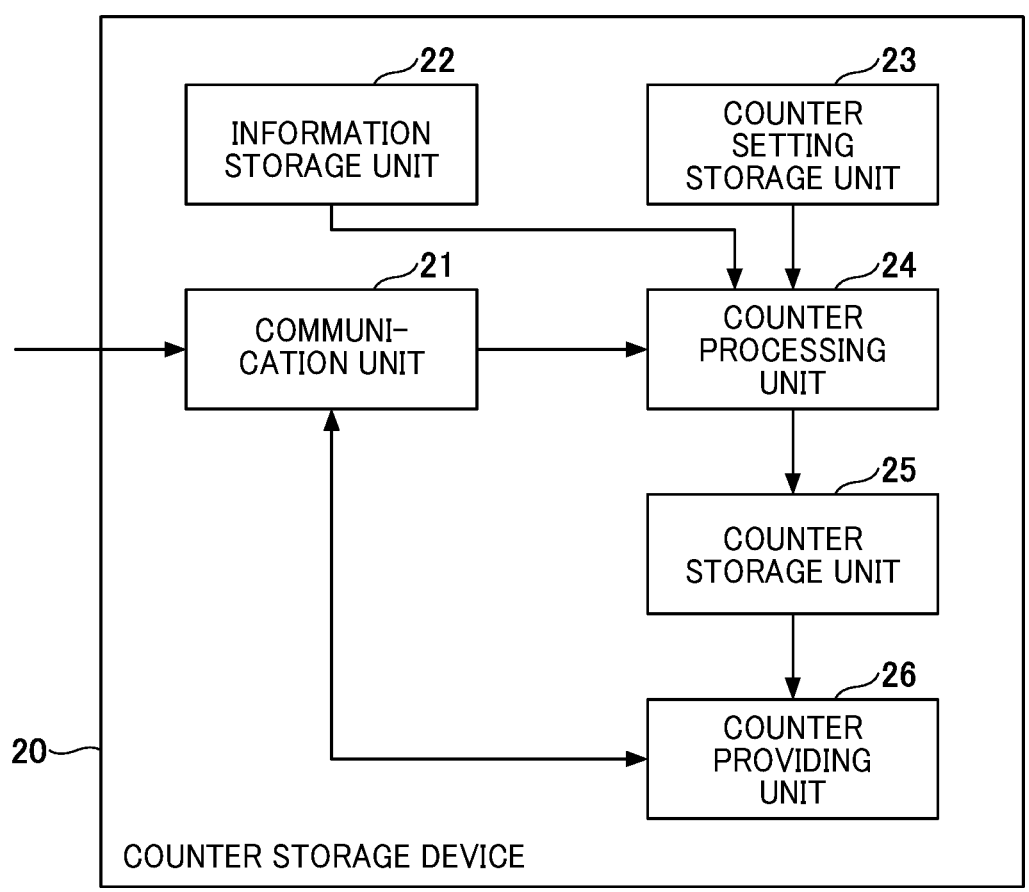
FIG. 4 is a block diagram illustrating a functional configuration of a counter storage device according to embodiments of the present disclosure.

The counter storage device 20 according to embodiments is implemented by functional blocks as illustrated for example in FIG. 4. FIG. 4 is a block diagram illustrating an example functional configuration of the counter storage device 20 according to embodiments. A function of the counter storage device 20 illustrated in FIG. 4 is implemented by executing the program.

As illustrated in FIG. 4, the counter storage device 20 includes a communication unit 21, an information storage unit 22, a counter setting storage unit 23, a counter processing unit 24, a counter storage unit 25, and a counter providing unit 26. The communication unit 21 performs data communication with the outside. For example, the communication unit 21 communicates with the display data generating device 18, the electronic device 12, the MFP 10 and the intermediary device 14.

The information storage unit 22 stores customer information, user information, and device information. The counter setting storage unit 23 stores a counter setting which is described below. The counter processing unit 24 stores counter data according to the counter setting stored in the counter setting storage unit 23. The counter processing unit 24 stores daily data and monthly data for each device, each customer environment, and each user in the counter storage unit 25 based on the counter setting. The counter storage unit 25 stores the daily data and the monthly data for each device, each customer environment, and each user.

For example, in response to a request designating at least one of the device identification information or the user identification information, the counter providing unit 26 provides the daily data and the monthly data stored in the counter storage unit 25 corresponding to at least one of the device identification information or the user identification information. In response to a request designating customer identification information from the MFP 10, the counter providing unit 26 may provide the daily data and the monthly data for each customer environment stored in the counter storage unit 25.

(MFP)

Figure 5:
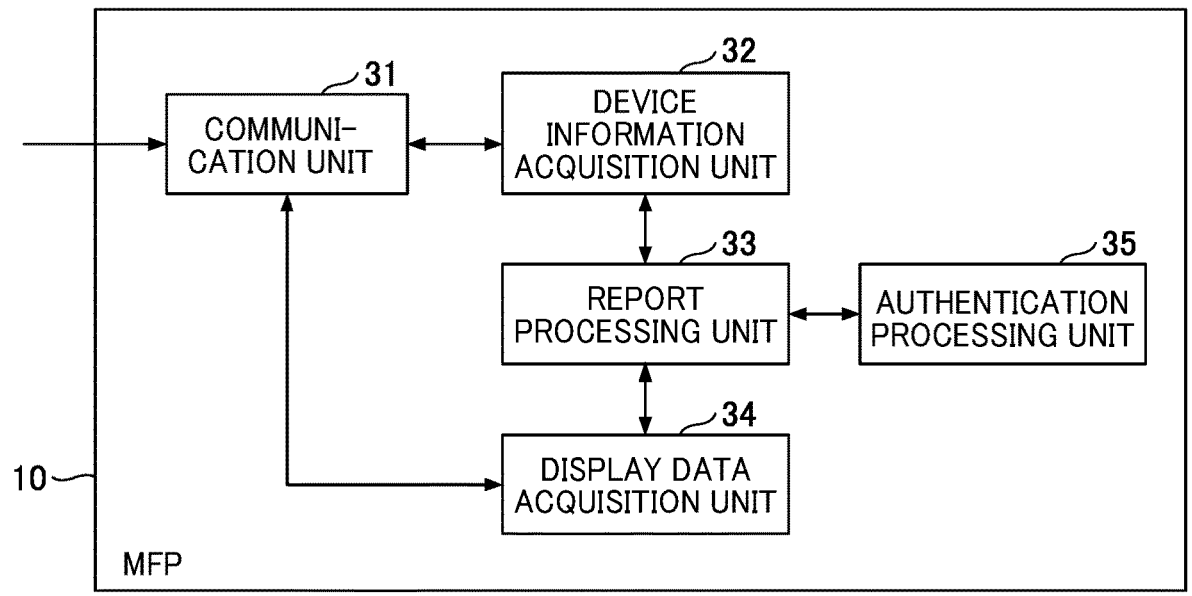
FIG. 5 is a block diagram illustrating a functional configuration of the MFP according to embodiments of the present disclosure.

The MFP 10 according to embodiments is implemented by, for example, functional blocks illustrated in FIG. 5. FIG. 5 is a block diagram illustrating an example functional configuration of the MFP 10 according to embodiments. The MFP 10 implements the functional blocks as illustrated in FIG. 5 by executing the program such as a report output application.

The MFP 10 includes a communication unit 31, a device information acquisition unit 32, a report processing unit 33, a display data acquisition unit 34, and an authentication processing unit 35 as illustrated in FIG. 5. The communication unit 31 performs data communication with the outside. For example, the communication unit 31 communicates data with the electronic device 12, the intermediary device 14, the counter storage device 20 and the display data generating device 18.

The device information acquisition unit 32 acquires device information such as a serial number (device identification (ID)) and a media access control (MAC) address from the device. The device information is an example of identification information of the device. The report processing unit 33 causes the operation panel 602 to display a report described below, acquired from the display data generating device 18. The report processing unit 33 may cause the printer 605 to print a report described below, acquired from the display data generating device 18.

The display data acquisition unit 34 acquires the display data of the report requested from the report processing unit 33 from the display data generating device 18 and provides the display data of the report to the report processing unit 33. The authentication processing unit 35 authenticates the user operating the MFP 10 based on the ID and password input from the user at the time of login or the information acquired through the IC card reader 607.

(Display Data Generating Device)

Figure 6:
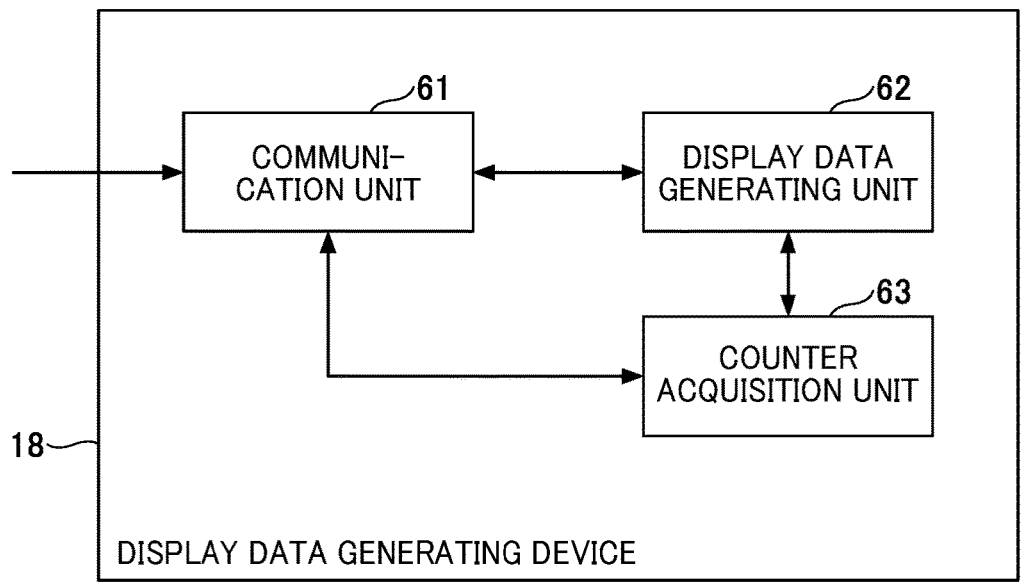
FIG. 6 is a block diagram illustrating a functional configuration of a display data generating device according to embodiments of the present disclosure.

The display data generating device 18 according to embodiments is implemented by the functional blocks illustrated for example, in FIG. 6. FIG. 6 is a block diagram illustrating a functional configuration of a display data generating device according to embodiments. The display data generating device 18 implements the functional blocks as illustrated in FIG. 6 by executing a program in conjunction with the appropriate hardware resources.

The display data generating device 18 illustrated in FIG. 6 includes the communication unit 61, the display data generating unit 62, and the counter acquisition unit 63. The communication unit 61 performs data communication with the outside. For example, the communication unit 61 performs data communication with the MFP 10, the electronic device 12, and the counter storage device 20. The display data generating unit 62 generates a report described below from, for example, daily data or monthly data of the MFP 10 or the electronic device 12 acquired from the counter storage device 20 and transmits the report to the device of the report display request source. The counter acquisition unit 63 acquires the daily data or the monthly data of the MFP 10 or the electronic device 12 requested from the display data generating unit 62 from the counter storage device 20 and provides the data to the display data generating unit 62.

(Setting and Data)

FIG. 7 is an illustration of a configuration of a counter setting according to embodiments. The counter setting includes a device ID, a Media Access Control or MAC address, a customer ID, a user ID, a daily data ID, a monthly data ID, and a monthly data calculation date as items.

The device ID is an example of device information acquired from the device. The MAC address is an example of device information for uniquely identifying the MFP 10 or the electronic device 12 on the network. The customer ID is an example of identification information for uniquely identifying the customer. The user ID is an example of identification information for uniquely identifying a user who operates a device such as the MFP 10 or the electronic device 12.

The daily data ID is an example of identification information for uniquely identifying the daily data corresponding to the MFP 10 or the electronic device 12 identified by the device ID or the MAC address, the customer identified by the customer ID and the user identified by the user ID. The monthly data ID is an example of identification information for uniquely identifying the monthly data corresponding to the MFP 10 or the electronic device 12 identified by the device ID or the MAC address, the customer identified by the customer ID and the user identified by the user ID. The monthly data calculation date indicates a calculation date of the customer for generating the monthly data.

FIG. 8 is an illustration of a configuration of the daily data according to embodiments. The daily data includes a daily data ID, a date (year/month/date), and various counter data as items. The daily data ID is an example of identification information for identifying the daily data. The date is the date on which the counter data of the corresponding daily data is counted. The various counter data are daily counter data of different types such as a total counter, a counter for each function, a counter for each color, and a counter for each paper size.

FIG. 9 is an illustration of a configuration of the monthly data according to embodiments. The monthly data includes a monthly data ID, the year/month, and various counter data as items. The monthly data ID is an example of identification information for identifying the monthly data. The year/month is the year and month on which the counter data of the corresponding monthly data is counted. The various counter data are monthly counter data of different types such as a total counter, a counter for each function, a counter for each color, and a counter for each paper size.

Processing (Counter Storage Processing)

The counter processing unit 24 of the counter storage device 20 according to embodiments receives the counter value from the MFP 10 or the intermediary device 14 in the customer environment, and based on the counter setting of FIG. 7, adds the daily data ID to the record of the daily data and stores the daily data to the counter storage unit 25.

The counter processing unit 24 creates the monthly data from the daily data for one month when the monthly data calculation date has passed. The counter processing unit 24 stores a record of the generated monthly data in the counter storage unit 25.

(Report Display Processing)

Figure 10:
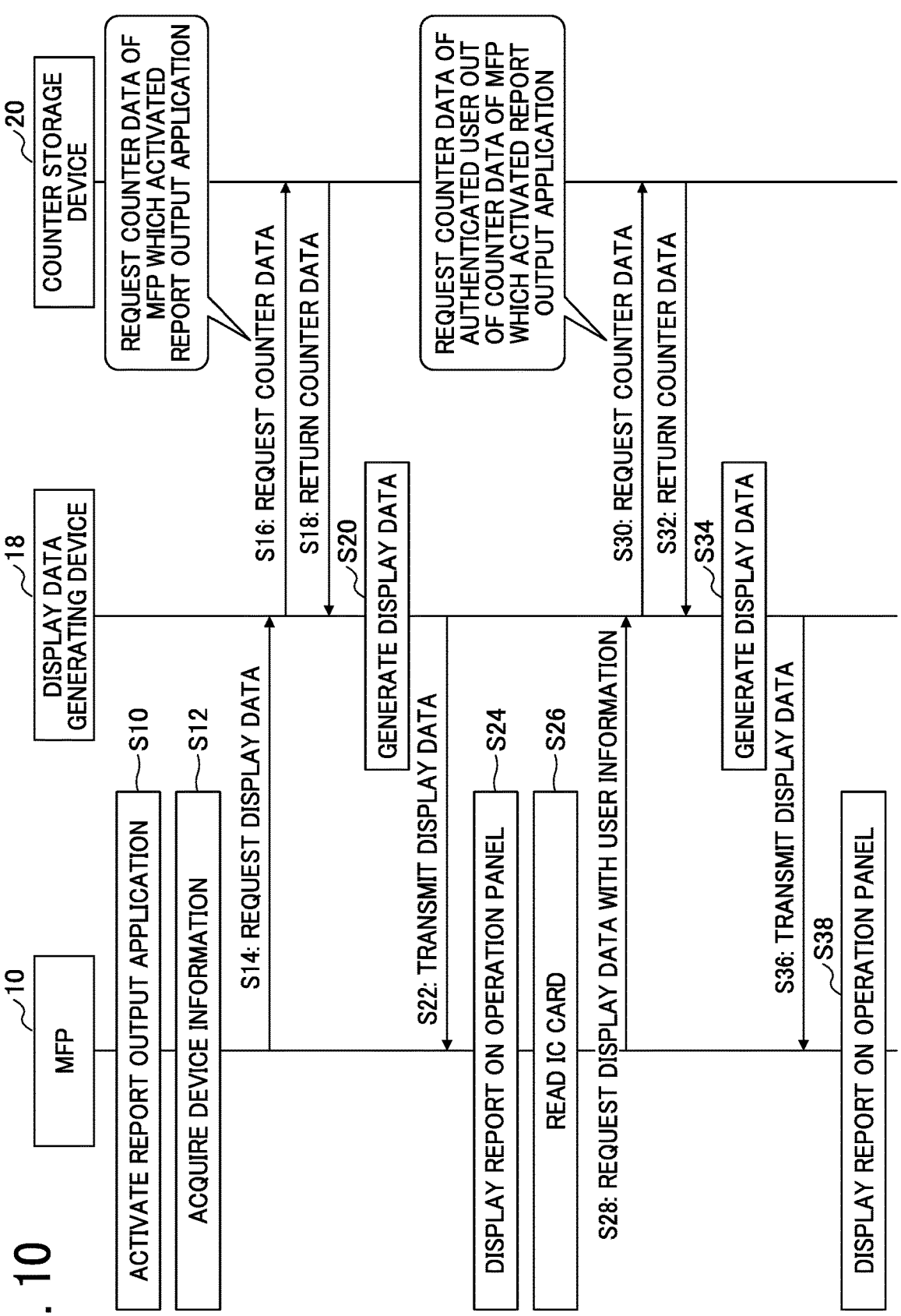
FIG. 10 is a sequence diagram illustrating a report displaying process according to embodiments of the present disclosure.

The information processing system 1 according to embodiments performs report display processing, for example, by the procedure illustrated in FIG. 10. FIG. 10 is a sequence diagram illustrating an example of the procedure of the report display process.

In step S10, for example, a user such as an administrator of the customer environment operates the MFP 10 to launch the report output application. Launching the report output application can be performed by the user selecting an icon of the report output application from an available application list screen displayed on the operation panel 602, for example.

In step S12, the device information acquisition unit 32 of the MFP 10 acquires the device information including the device identification information such as the device ID or the MAC address, from inside the MFP 10. Here, it is assumed that "α" is acquired as the device identification information. In step S14, the display data acquisition unit 34 of the MFP 10 designates the device identification information "α" acquired by the device information acquisition unit 32 in step S12 and requests the display data from the display data generating device 18.

In step S16, the counter acquisition unit 63 of the display data generating device 18 acquires the counter data such as the daily data and the monthly data of the MFP 10 designated by the device identification information "α" in the counter storage device 20. In step S18, the counter providing unit 26 of the counter storage device 20 reads the counter data corresponding to the device identification information "α" from the counter storage unit 25 in response to the counter data acquisition request from the display data generating device 18 designating the device identification information "α". Then, the counter providing unit 26 returns the counter data corresponding to the device identification information "α" to the display data generating device 18.

In step S20, the display data generating unit 62 of the display data generating device 18 generates a report based on the counter data returned from the counter storage device 20. The report may include graphs and/or tables. In step S22, the display data generating unit 62 transmits the display data of the generated report to the MFP 10 which requested the display data of the report.

Figure 11:
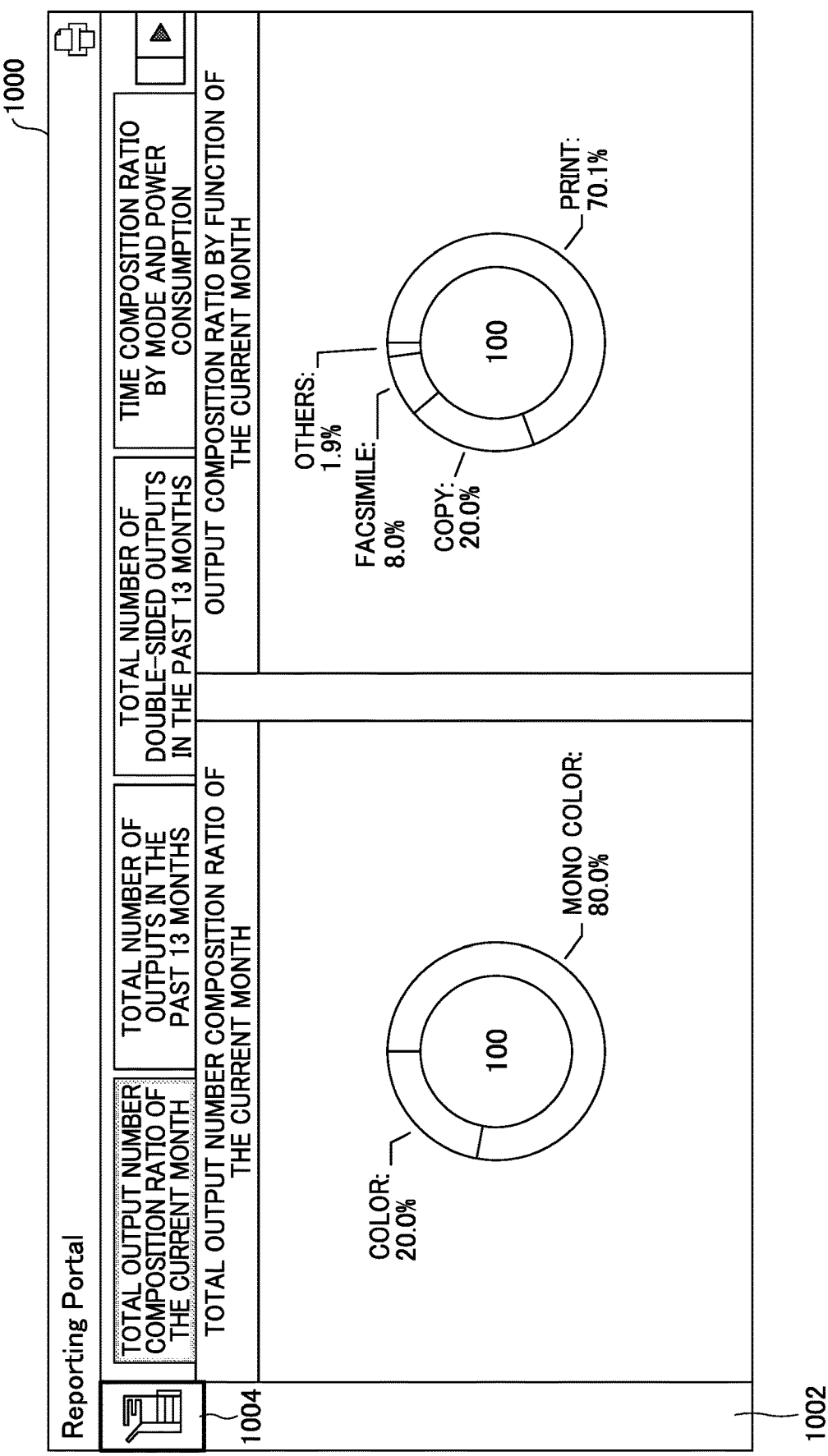
FIG. 11 is a conceptual diagram illustrating a report displayed on an operation panel according to embodiments of the present disclosure.

In step S24, the report processing unit 33 of the MFP 10 displays the report received in step S22 on the operation panel 602, for example, as illustrated in FIG. 11. FIG. 11 is a conceptual diagram illustrating an example of the report displayed on the operation panel. FIG. 11 is an illustration of a screen 1000 in which a tab of total output number composition ratio of the current month is selected in the report. Further, when a tab of total number of outputs (corresponding to the past 13 months) on the screen 1000 is selected, the screen shifts to the example screen as illustrated in FIG. 12, and when a tab of time composition ratio (%) and power consumption amount (kWh) for each mode in the screen 1000 is selected, the example screen as illustrated in FIG. 13 is displayed.

Figure 12:
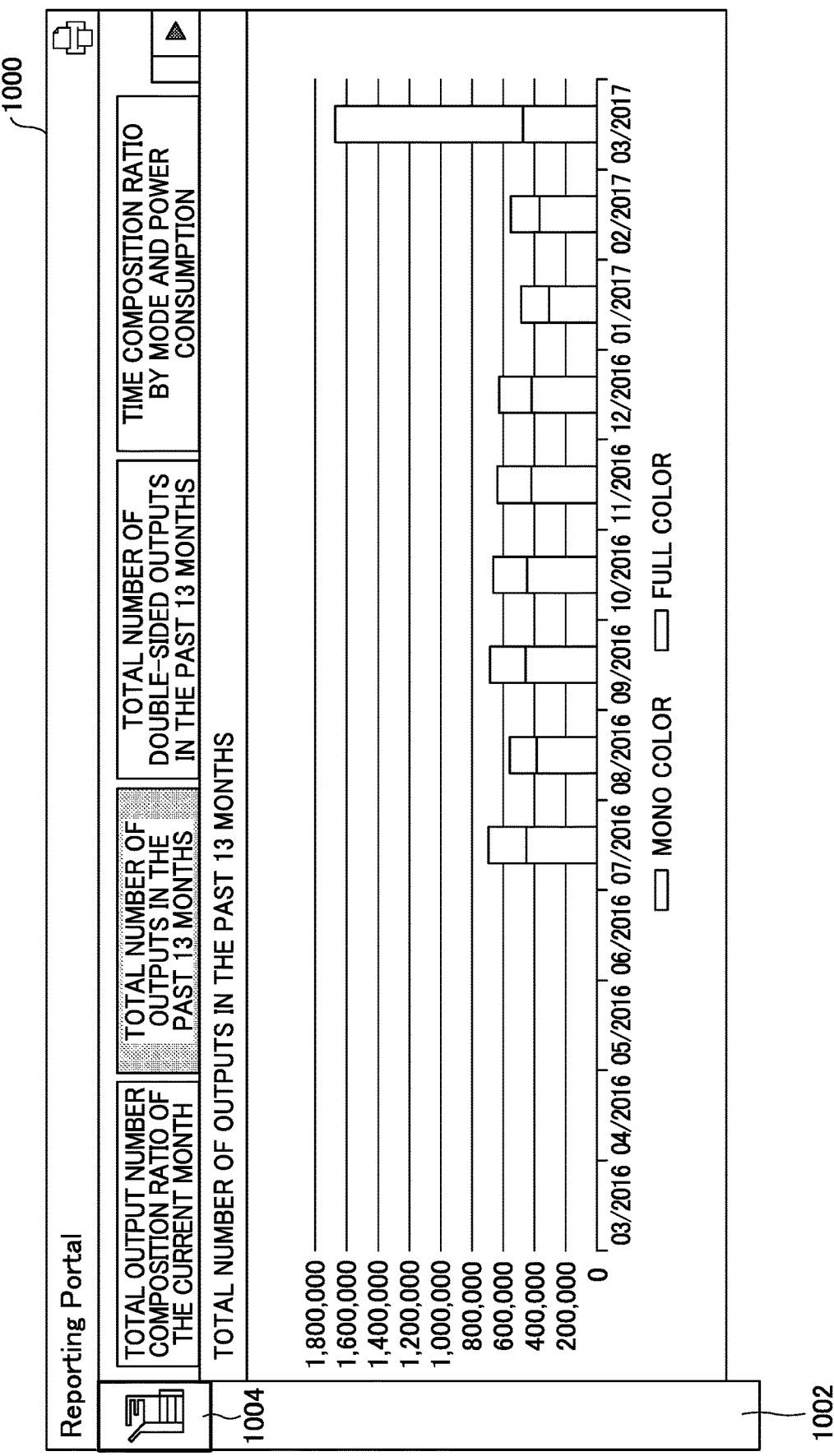
FIG. 12 is a conceptual diagram illustrating a report displayed on the operation panel according to embodiments of the present disclosure.
Figure 13:
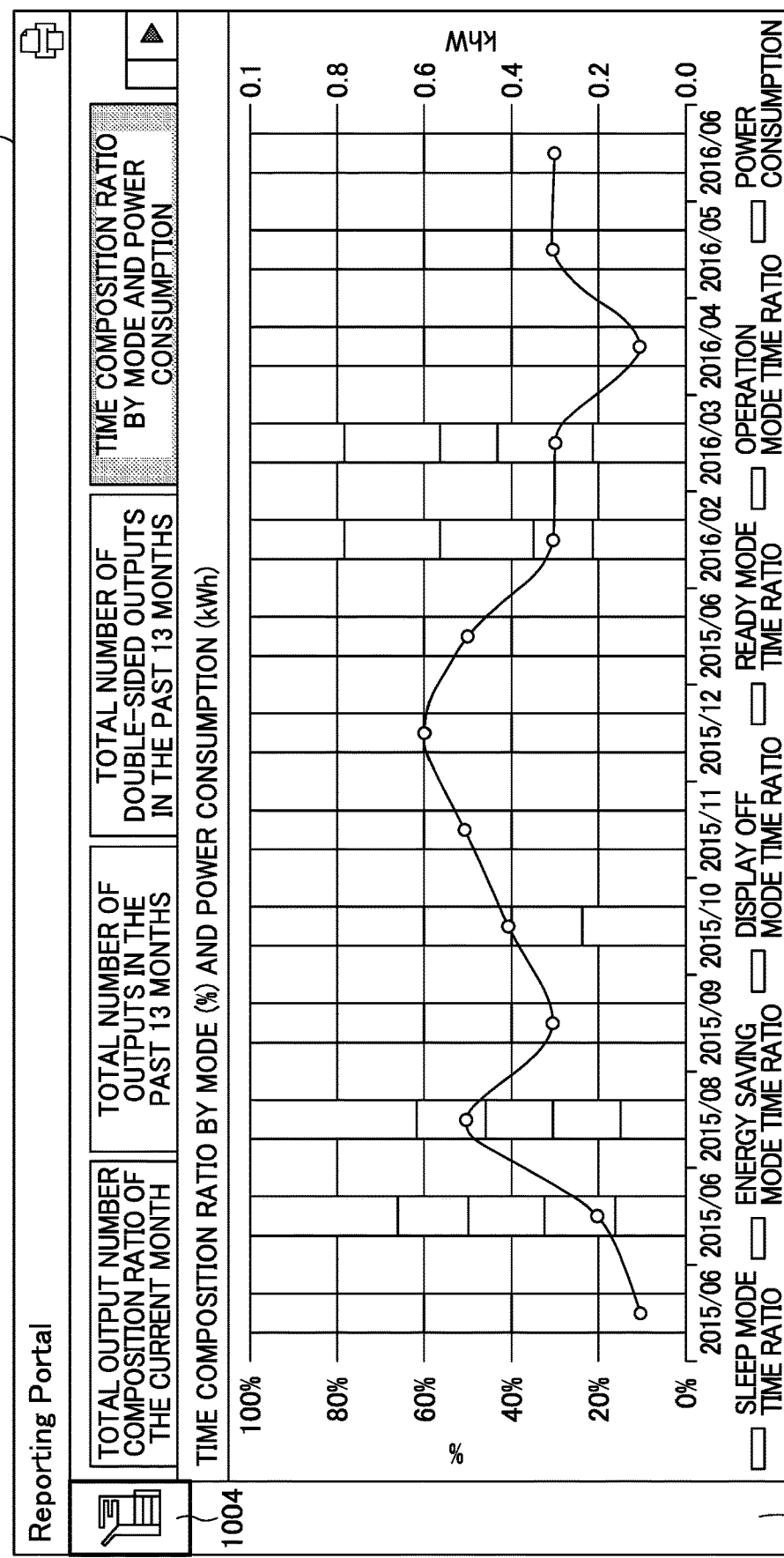
FIG. 13 is a conceptual diagram illustrating a report displayed on the operation panel according to embodiments of the present disclosure.

Since the screen 1000 in FIGS. 11 to 13 is an example in which the report output application is launched without authenticating the user, a report based on the counter data of the MFP 10 with the device identification information "α" is displayed. In the screen 1000 of FIGS. 11 to 13, a device menu 1004 is displayed in a menu column 1002 on the left side.

In step S26, the MFP 10 having the identification information "α" reads information from an IC card owned by the user through the IC card reader 607. The authentication processing unit 35 of the MFP 10 authenticates the user who operates the MFP 10 based on the information read from the IC card. Here, it is assumed that the user of the identification information "user A" is authenticated.

In step S28, the display data acquisition unit 34 of the MFP 10 designates the device identification information "α" acquired in step S12 and the user identification information "user A" authenticated in step S26 and requests the display data generating device 18 for the display data of the report.

In step S30, the counter acquisition unit 63 of the display data generating device 18 requests to acquire the counter data such as the daily data and the monthly data of the MFP 10 designated by the device identification information "α" and the user identification information "user A" to the counter storage device 20. The counter data requested in step S30 is the counter data used by the user authenticated in step S26, out of the counter data of the MFP 10 that launched the report output application in step S10.

The counter providing unit 26 of the counter storage device 20 receives the counter data acquisition request from the display data generating device 18 designating the device identification information "α" and the user identification information "user A". In step S32, the counter providing unit 26 reads the counter data corresponding to the device identification information "α" and the user identification information "user A" from the counter storage unit 25 in response to the counter data acquisition request. Then, the counter providing unit 26 returns to the display data generating device 18 the counter data corresponding to the device identification information "α" and the user identification information "user A".

In step S34, the display data generating unit 62 of the display data generating device 18 generates a report based on the counter data returned from the counter storage device 20. The report may include graphs and tables. In step S36, the display data generating unit 62 transmits the generated report to the MFP 10 which requested the display data of the report designating the device identification information "α" and the user identification information "user A" in step S28.

Figure 14:
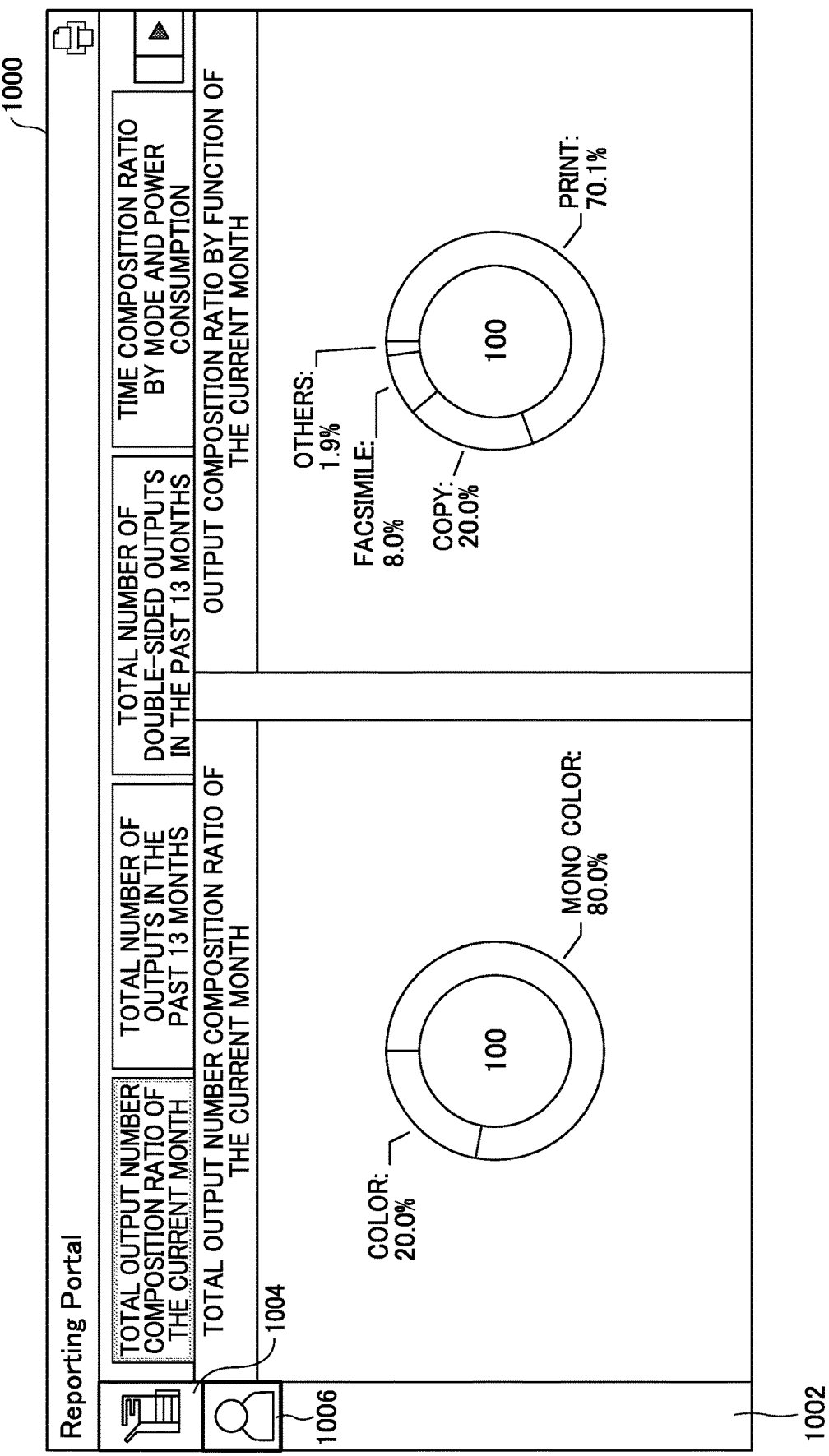
FIG. 14 is a conceptual diagram illustrating a report displayed on the operation panel according to embodiments of the present disclosure.

In step S38, the report processing unit 33 of the MFP 10 displays the report received in step S36 on the operation panel 602 as illustrated in FIG. 14, for example. FIG. 14 is a conceptual diagram illustrating an example of the report displayed on the operation panel.

FIG. 14 is an illustration of the screen 1000 in which the tab of the total output number composition ratio of the current month is selected in the report. Since the screen 1000 as illustrated in FIG. 14 is an example after authenticating the user, a report based on the counter data of the user identification information "user A" and the device identification information "α" is displayed.

In the screen 1000 of FIG. 14, a user menu 1006 is added to the menu column 1002 on the left side. The user can switch between the reports in FIG. 11 to FIG. 13 and the report in FIG. 14 in the device menu 1004 and the user menu 1006 in the menu column 1002 on the screen 1000 in FIG. 14.

When the user A logs out (requests to end use) after step S38, the report processing unit 33 of the MFP 10 deletes the user menu 1006 from the menu column 1002 and may return to the screen 1000 as illustrated in FIG. 11, for example.

In the sequence diagram illustrated in FIG. 10, an example of authenticating the user using the IC card is described, but authentication by ID and password may be used. Also, in the sequence diagram illustrated in FIG. 10, the counter data acquisition request in step S30 is the counter data used by the user authenticated in step S26, out of the counter data of the MFP 10 that launched the report output application in step S10.

Figure 15:
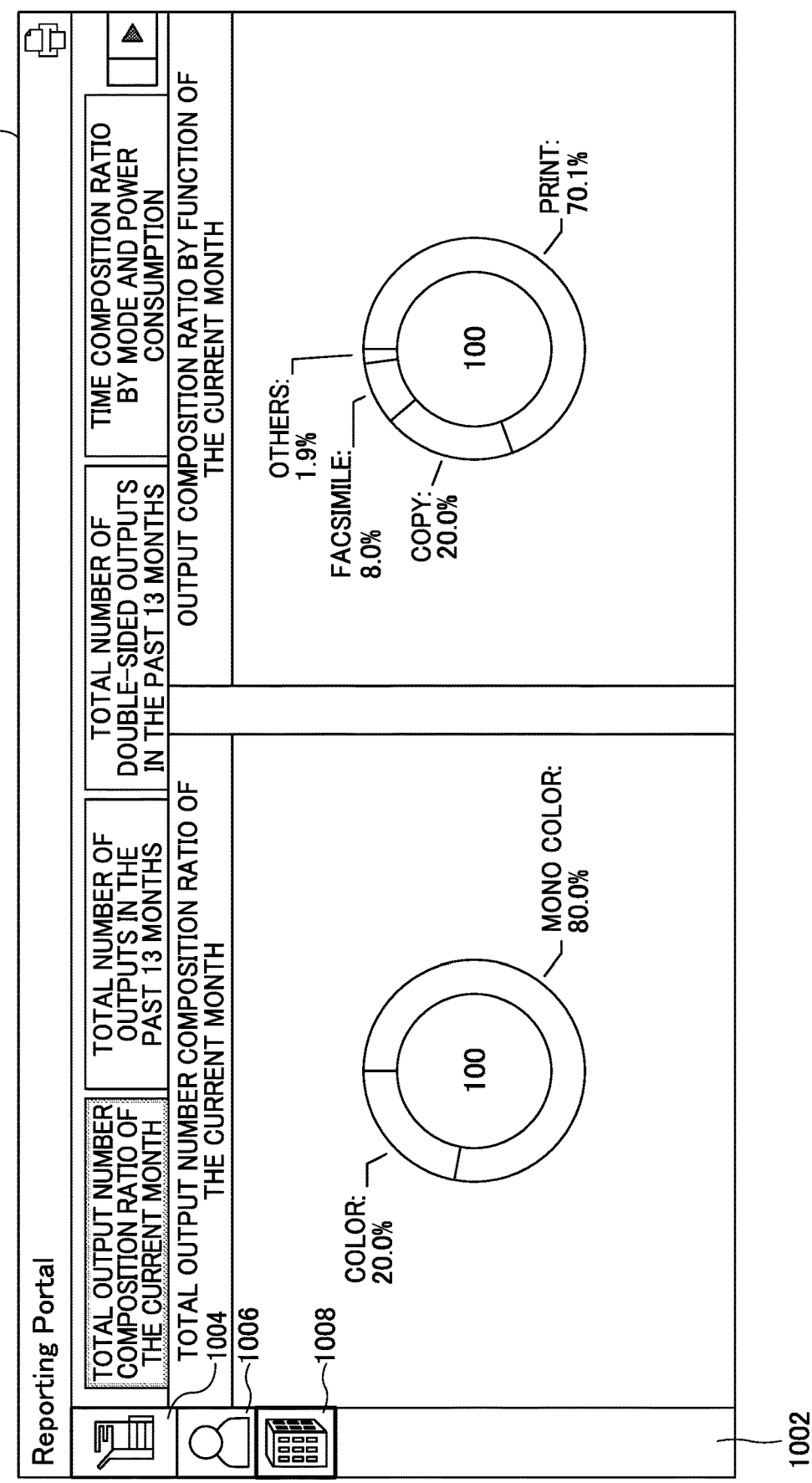
FIG. 15 is a conceptual diagram illustrating a report displayed on the operation panel according to embodiments of the present disclosure.

The counter data acquisition request in step S30 is not limited to the MFP 10 which launched the report output application in step S10 but may be the counter data of a plurality of MFP 10 used by the user authenticated in step S26. Further, as in the screen 1000 illustrated in FIG. 15, a customer menu 1008 may be provided in the menu column 1002 to request acquisition of counter data of one or more MFP 10 owned by a customer in step S30. Also, in step S30, the acquisition of the counter data of one or more users belonging to the customer may be requested.

The screen 1000 in FIGS. 11 to 15 may be displayed in accordance with setting information for screen display preset by each user. As a result, the user can select display the screen 1000 according to the preference of the user.

Other Embodiments

In the information processing system 1 as illustrated in FIG. 1, the display data generating device 18 and the counter storage device 20 are connected to a network 40 such as the internet outside the customer environment. In other words, the information processing system 1 as illustrated in FIG. 1 is an example in which the display data generating device 18 and the counter storage device 20 are provided in a cloud environment.

Figure 16:
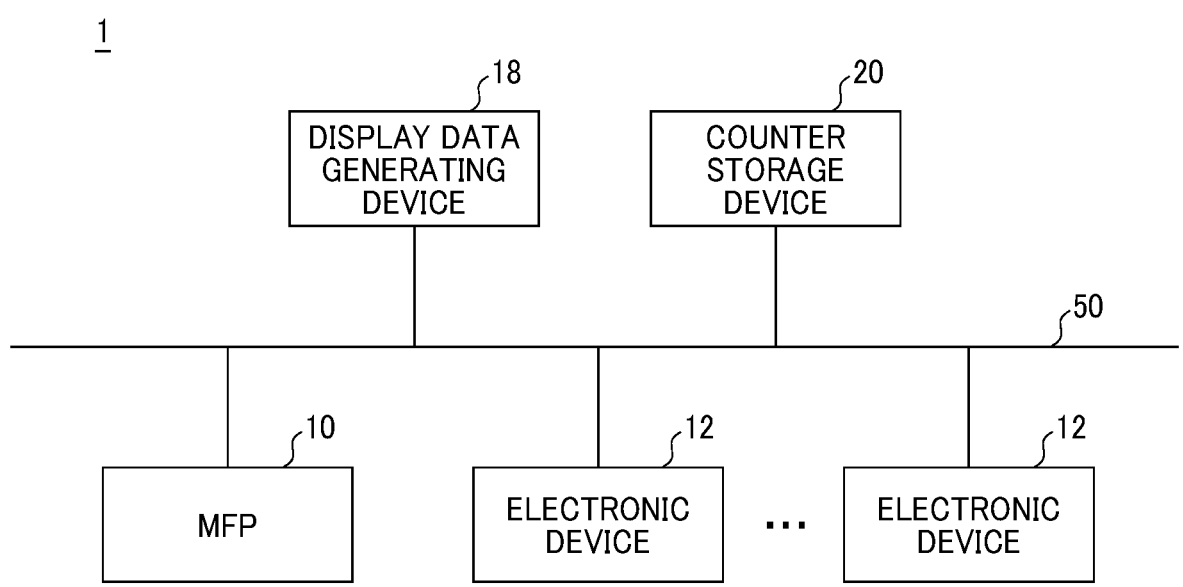
FIG. 16 is a schematic view illustrating a configuration of an information processing system according to another embodiment of the present disclosure.

By contrast, the display data generating device 18 and the counter storage device 20 may be provided inside the customer environment (on-premises environment) as illustrated in FIG. 16. FIG. 16 is a configuration diagram of an example of the information processing system according to another embodiment. In the information processing system 1 as illustrated in FIG. 16, an MFP 10, one or more electronic devices 12, a display data generating device 18, and a counter storage device 20 are connected through a network 50 of a customer environment. The hardware configuration, software configuration, and processing of the information processing system 1 as illustrated in FIG. 16 and of the information processing system 1 as illustrated FIG. 1 are the same. Thus, description thereof is omitted.

As described above, with the information processing system 1 according to embodiments it is possible to display a report based on the counter data of the MFP 10 with or without considering the user in accordance with the situation, such as whether or not the user is authenticated. Therefore, with the information processing system 1 according to embodiments it is possible to display information on the usage record of the device flexibly, according to the situation.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of this disclosure and appended claims. Thus, the MFP 10 is an example of the image forming apparatus. The counter storage device 20 is an example of a usage information storage device.

In addition, the information on the usage record is not limited to the counter value. The information on the usage record includes the time used, the data amount and the number of images of the captured image, the communication data amount, the time when the data is outputted and the amount of the data to be output. The information processing system 1 described in the above embodiment is just an example, and there may be various system configurations depending on applications or purposes.

Any of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

What is claimed is:

1. An image forming apparatus comprising:
   a memory that stores a plurality of instructions; and
   processing circuitry configured to:
   acquire device identification information of the image forming apparatus;
   receive input of user identification information in association with a usage start request;
   acquire device usage information, regarding prior total usage of the image forming apparatus that occurred over at least one day, stored in association with the device identification information of the image forming apparatus prior to the input of the user identification information being received;
   output display data on the acquired device usage information regarding the prior total usage of the image forming apparatus that occurred over at least one day on an operation panel provided for the image forming apparatus prior to the input of the user identification information being received;
   acquire device usage information, regarding prior total usage of the image forming apparatus that occurred over at least one day, stored in association with the user identification information when input of the user identification information is received; and
   switch the display data displayed on the operation panel to output display data on the acquired device usage information stored in association with the user identification information, instead of the display data on the acquired device usage information regarding the prior total usage of the image forming apparatus, on the operation panel.

2. The image forming apparatus of claim 1, wherein the processing circuitry outputs the display data on the device usage information stored in association with the device identification information of the image forming apparatus after receiving a usage completion request for the usage start request.

3. The image forming apparatus of claim 1, wherein the processing circuitry outputs the acquired device usage information according to user-specific setting information stored.

4. The image forming apparatus of claim 1, wherein the processing circuitry acquires the device usage information in association with one or more devices associated with an organization in association with a user in response to receiving the usage start request in association with the user identification information.

5. The image forming apparatus of claim 1, wherein the processing circuitry acquires the device usage information in association with one or more devices associated with an organization in association with the image forming apparatus when the usage start request in association with the user identification information is not received.

6. The image forming apparatus of claim 1, wherein the processing circuitry provides usage information indicating a usage log of the image forming apparatus to an external device via a network, and the acquired device usage information is received as the display data from a display data generating device via the network.

7. The image forming apparatus of claim 6, wherein the display data received from the display data generating device is in a form of a report that includes a plurality of graphic representations of the device usage information corresponding to a plurality of different categories of usage of the image forming apparatus.

8. The image forming apparatus of claim 7, wherein the plurality of graphic representations of the device usage information correspond to different durations of usage of the image forming apparatus.

9. The image forming apparatus of claim 7, wherein at least one of the plurality of graphic representations of the device usage information corresponds to usage of different functions on the image forming apparatus for a particular duration of time.

10. The image forming apparatus of claim 7, wherein at least one of the plurality of graphic representations of the device usage information corresponds to usage of different color composition ratios on the image forming apparatus for a particular duration of time.

11. The image forming apparatus of claim 7, wherein at least one of the plurality of graphic representations of the device usage information corresponds to a time composition ratio by mode and power consumption of the image forming apparatus for a particular duration of time.

12. The image forming apparatus of claim 1, wherein the processing circuitry provides usage information indicating a usage log of the image forming apparatus to an external device via a network, and the acquired device usage information is received as the display data from a display data generating device via the network,
   the display data received from the display data generating device is in a form of a report that includes a plurality of graphic representations of the device usage information corresponding to a plurality of different categories of usage of the image forming apparatus, and
   at least one of the plurality of graphic representations of the device usage information corresponds to usage of different functions on the image forming apparatus for a particular duration of time, wherein at least a printing function is a first one of the different functions and at least one of a copy function and a facsimile function is a second one of the different functions.

13. A display data output method performed by an image forming apparatus, the method comprising:
   acquiring device identification information of the image forming apparatus;
   receiving input of user identification information in association with a usage start request;
   acquiring device usage information, regarding prior total usage of the image forming apparatus that occurred over at least one day, stored in association with the device identification information of the image forming apparatus prior to the input of the user identification information being received;
   outputting display data on the acquired device usage information regarding the prior total usage of the image forming apparatus that occurred over at least one day on an operation panel provided for the image forming apparatus prior to the input of the user identification information being received;
   acquiring device usage information, regarding prior total usage of the image forming apparatus that occurred over at least one day, stored in association with the user identification information when input of the user identification information is received; and
   switching the display data displayed on the operation panel to output display data on the acquired device usage information stored in association with the user identification information, instead of the display data on the acquired device usage information regarding the prior total usage of the image forming apparatus, on the operation panel.

14. An information processing system comprising:
   an image forming apparatus; and
   a usage information storage device connected to the image forming apparatus through a network, the image forming apparatus including processing circuitry being configured to:
   acquire device identification information of the image forming apparatus,
   receive input of user identification information in association with a usage start request,
   acquire device usage information, regarding prior total usage of the image forming apparatus that occurred over at least one day, stored in association with the device identification information of the image forming apparatus prior to the input of the user identification information being received,
   output display data on the acquired device usage information regarding the prior total usage of the image forming apparatus that occurred over at least one day on an operation panel provided for the image forming apparatus prior to the input of the user identification information being received,
   acquire device usage information, regarding prior total usage of the image forming apparatus that occurred over at least one day, stored in association with the user identification information when input of the user identification information is received, and
   switch the display data displayed on the operation panel to output display data on the acquired device usage information stored in association with the user identification information, instead of the display data on the acquired device usage information regarding the prior total usage of the image forming apparatus, on the operation panel.

* * * * *